(12) United States Patent
Kojima et al.

(10) Patent No.: US 12,261,676 B2
(45) Date of Patent: Mar. 25, 2025

(54) SIGNAL PROCESSING APPARATUS, WIRELESS COMMUNICATION SYSTEM AND SIGNAL PROCESSING METHOD

(71) Applicant: NIPPON TELEGRAPH AND TELEPHONE CORPORATION, Tokyo (JP)

(72) Inventors: Yasuyoshi Kojima, Musashino (JP); Kiyohiko Itokawa, Musashino (JP); Daisuke Goto, Musashino (JP); Kazumitsu Sakamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 106 days.

(21) Appl. No.: 18/268,366

(22) PCT Filed: Dec. 25, 2020

(86) PCT No.: PCT/JP2020/048662
§ 371 (c)(1),
(2) Date: Jun. 20, 2023

(87) PCT Pub. No.: WO2022/137493
PCT Pub. Date: Jun. 30, 2022

(65) Prior Publication Data
US 2024/0039620 A1  Feb. 1, 2024

(51) Int. Cl.
*H04B 7/185* (2006.01)
*H04B 1/10* (2006.01)

(52) U.S. Cl.
CPC .............. *H04B 7/185* (2013.01); *H04B 1/10* (2013.01)

(58) Field of Classification Search
CPC ............. H04B 7/185; H04B 1/10; H04B 7/14
USPC ......................................................... 375/262
See application file for complete search history.

(56) References Cited

U.S. PATENT DOCUMENTS 6,718,161 B1    4/2004    Westall et al.

FOREIGN PATENT DOCUMENTS

| JP | H07277299 A | 10/1995 |
| JP | 2000022616 | * 1/2000 |
| JP | 2002044001 A | 2/2002 |
| JP | 2009135963 A | 6/2009 |
| JP | 2020536409 A | 12/2020 |
| WO | WO-2005104503 A2 | 11/2005 |
| WO | WO-2019067651 A1 | 4/2019 |

OTHER PUBLICATIONS

Wei Feng et al., UAV-Aided MIMO Communications for 5G Internet of Things, IEEE Internet of Things Journal, vol. 6, No. 2, Apr. 2019, pp. 1731-1740.

* cited by examiner

*Primary Examiner* — Leila Malek

(57) ABSTRACT

An acquisition unit acquires a plurality of signals received by a plurality of antennas included in a wireless communication device that moves in a predetermined orbit above a celestial body. A parameter determination unit determines a synthesis parameter of the plurality of signals according to the position of a transmission terminal provided on the celestial body, the orbit, and the reception time of the plurality of signals. A synthesis unit synthesizes a transmission signal of the transmission terminal according to the plurality of signals and the synthesis parameter.

8 Claims, 8 Drawing Sheets

| TIME | AREA |
|---|---|
| 2022/11/5 23:00-23:02 | 4c, 4d, 5c |
| 2022/11/5 23:02-23:04 | 4b, 4c, 4d, 5b, 5c |
| 2022/11/5 23:04-23:06 | 4b, 4c, 4d, 5b, 5c |
| 2022/11/5 23:06-23:08 | 3d, 4b, 4c, 4d, 5b, 5c |
| 2022/11/5 23:08-23:10 | 3d, 4b, 4c, 4d, 5b, 5c |
| 2022/11/5 23:10-23:12 | 2d, 3d, 4b, 4c, 4d, 5b, 5c |
| 2022/11/5 23:12-23:14 | 2d, 3d, 4b, 4c, 4d, 5b, 5c |
| 2022/11/5 23:14-23:16 | 2d, 3d, 4b, 4c, 4d |
| 2022/11/5 23:16-23:18 | 2d, 3d, 4c, 4d |
| 2022/11/5 23:18-23:20 | 2d, 3d |

FIG. 3

SIGNAL PROCESSING APPARATUS, WIRELESS COMMUNICATION SYSTEM AND SIGNAL PROCESSING METHOD

CROSS-REFERENCE TO RELATED APPLICATIONS

This application is a 371 National Stage of International Application No. PCT/JP2020/048662, filed on Dec. 25, 2020. The entire disclosure of the above application is incorporated herein by reference.

TECHNICAL FIELD

The present invention relates to a signal processing device(a signal processing apparatus), a wireless communication system, and a signal processing method.

BACKGROUND ART

With the development of IoT (Internet of Things) technology, it is studied to install IoT terminals including various sensors in various places. For example, it is also assumed that IoT is used to collect data of places where it is difficult to install base stations, such as buoys and ships on the sea and mountainous areas. Meanwhile, there is a technology that performs wireless communication with a communication device on the ground by using a UAV (unmanned aerial vehicle) or a geostationary satellite (e.g., refer to Non Patent Literature 1).

CITATION LIST

Non Patent Literature

Non Patent Literature 1: Wei Feng, et al. "UAV-aided MIMO communications for 5G Internet of Things", IEEE Internet of Things Journal, Volume 6, Issue 2, 2019, p. 1731-1740

SUMMARY OF INVENTION

Technical Problem

In the case where a wireless communication device collects data from the sky, the higher the altitude of the wireless communication device is, the larger the propagation loss with a transmission terminal on the ground is, and the worse the communication quality is.

In view of the above circumstances, an object of the present invention is to provide a signal processing device, a wireless communication system, and a signal processing method that improve communication quality by compensating for a propagation loss when a wireless communication device moving above a celestial body collects data.

Solution to Problem

An aspect of the present invention is a signal processing device including: an acquisition unit that acquires a plurality of signals received by a plurality of antennas included in a wireless communication device that moves in a predetermined orbit above a celestial body; a parameter determination unit that determines a synthesis parameter of the plurality of signals according to a position of a transmission terminal provided on the celestial body, the orbit, and a reception time of the plurality of signals; and a synthesis unit that synthesizes a transmission signal of the transmission terminal according to the plurality of signals and the synthesis parameter.

An aspect of the present invention is a wireless communication system including: the signal processing device according to the above aspect; a wireless communication device that moves in a predetermined orbit above a celestial body and includes a plurality of antennas; and a transmission terminal provided on the celestial body, in which the transmission terminal includes: a storage unit that stores observation data observed on the celestial body; a position acquisition unit that acquires position data indicating a position of the transmission terminal; a timing determination unit that determines a timing of transmitting the observation data according to the orbit of the wireless communication device; and a transmission unit that transmits a transmission signal storing the observation data and the position data at the determined timing.

An aspect of the present invention is a signal processing method including: a step of acquiring a plurality of signals received by a plurality of antennas included in a wireless communication device that moves in a predetermined orbit above a celestial body; a step of determining a synthesis parameter of the plurality of signals according to a position of a transmission terminal provided on the celestial body, the orbit, and a reception time of the plurality of signals; and a step of synthesizing a transmission signal of the transmission terminal according to the plurality of signals and the synthesis parameter.

Advantageous Effects of Invention

By the present invention, it becomes possible to improve communication quality by compensating for a propagation loss when a wireless communication device moving above a celestial body collects data.

BRIEF DESCRIPTION OF DRAWINGS

FIG. 3 is a diagram showing changes of presence areas in coverage according to the first embodiment.

DESCRIPTION OF EMBODIMENTS

Hereinbelow, embodiments of the present invention are described in detail with reference to the drawings.

First Embodiment

Figure 1:
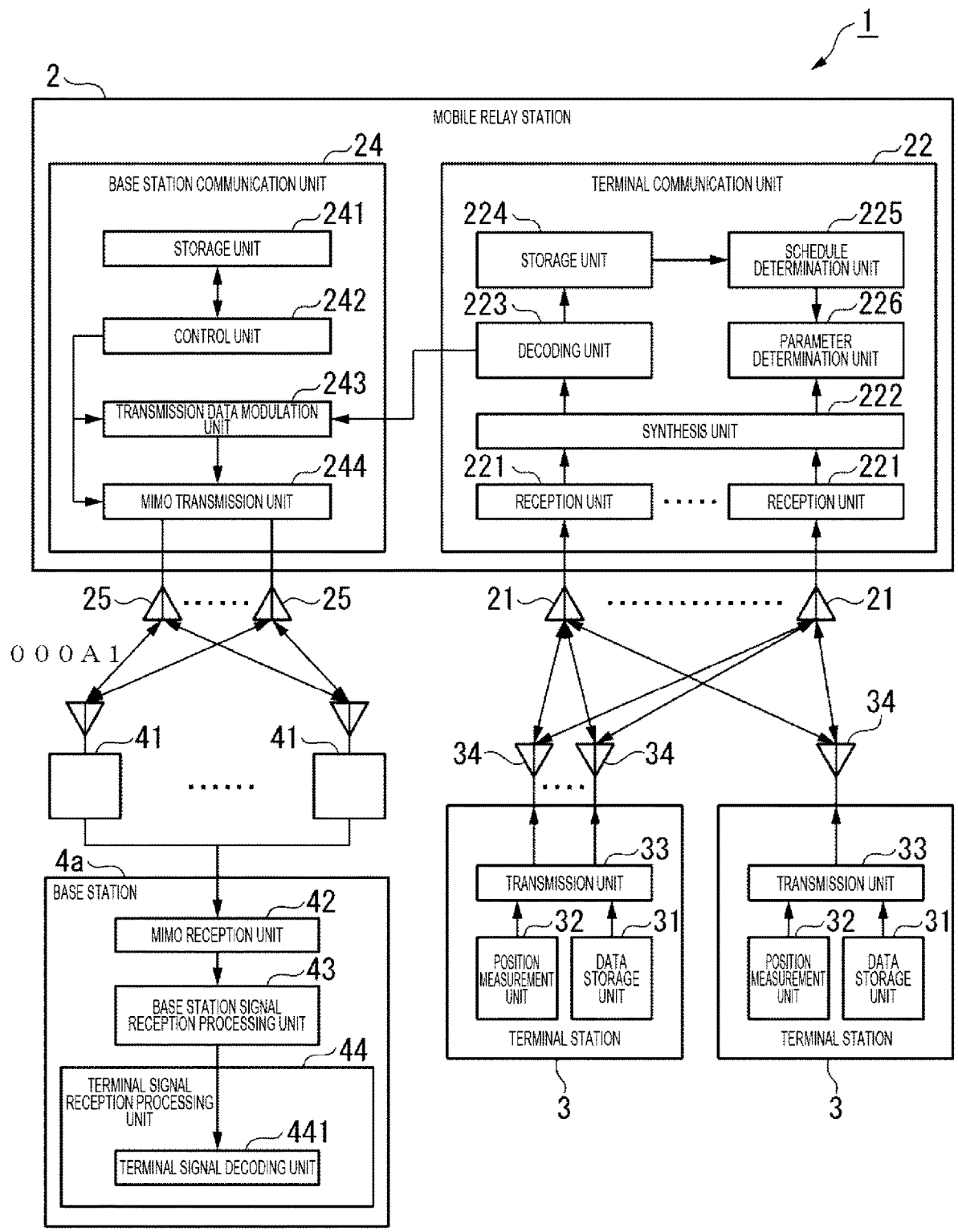
FIG. 1 is a configuration diagram of a wireless communication system according to a first embodiment.

FIG. 1 is a configuration diagram of a wireless communication system 1 according to a first embodiment. The wireless communication system 1 includes a mobile relay station 2, a terminal station 3, and a base station 4. The number of mobile relay stations 2, the number of terminal stations 3, and the number of base stations 4 included in the wireless communication system 1 are arbitrary, but the number of terminal stations 3 is assumed to be large.

The mobile relay station 2 is an example of a relay device that is mounted on a moving object and of which the communication-available area moves with the lapse of time. The mobile relay station 2 is provided in, for example, a LEO (low earth orbit) satellite. The altitude of the LEO satellite is 2000 km or less, and the LEO satellite orbits above the earth in about 1.5 hours per round. The terminal station 3 and the base station 4 are installed on the earth such as on the ground or on the sea. The terminal station 3 is, for example, an IoT terminal. The terminal station 3 collects data such as environment data detected by a sensor, and wirelessly transmits the data to the mobile relay station 2. In the drawing, only two terminal stations 3 are shown. While moving above the earth, the mobile relay station 2 receives data transmitted from a plurality of terminal stations 3 by means of wireless signals, and wirelessly transmits the received data to the base station 4. The base station 4 receives, from the mobile relay station 2, the data collected by the terminal station 3.

It is conceivable that a relay station mounted on an unmanned aerial vehicle such as a geostationary satellite, a drone, or a HAPS (high-altitude platform station) is used as the mobile relay station 2. However, in the case of a relay station mounted on a geostationary satellite, although the coverage area (footprint) on the ground is large, the altitude is high, and accordingly the propagation loss with the IoT terminal installed on the ground is large; therefore, the received power is very small, and the quality is degraded. On the other hand, in the case of a relay station mounted on a drone or a HAPS, although the propagation loss is small and the quality is high, the coverage area is small. Furthermore, the drone requires a battery, and the HAPS requires a solar panel. In the present embodiment, the mobile relay station 2 is mounted on a LEO satellite. Therefore, in addition to the propagation loss being within a limit, the LEO satellite is free from air resistance and consumes less fuel because it orbits outside the atmosphere. Further, the footprint is larger than in the case where a relay station is mounted on a drone or a HAPS.

However, the mobile relay station 2 mounted on a LEO performs communication while moving at high speed, and hence experiences a Doppler shift in a wireless signal. Further, the relay station mounted on a LEO has a larger propagation loss of the reception signal than in the case where a relay station is mounted on a drone or a HAPS. Thus, the mobile relay station 2 receives a wireless signal from the terminal station 3 by means of a plurality of antennas, and transmits a wireless signal to the base station 4 by means of a plurality of antennas. The communication quality can be enhanced by a diversity effect and a beamforming effect of communication using a plurality of antennas. In the present embodiment, a case where the mobile relay station 2 relays a wireless signal received from the terminal station 3 by means of a plurality of antennas to the base station 4 by MIMO (multiple input multiple output) is described as an example. The method of relaying to the base station 4 may be other than MIMO.

A configuration of each device will now be described.

The mobile relay station 2 includes a plurality of first antennas 21, a terminal communication unit 22, a base station communication unit 24, and a plurality of second antennas 25. The terminal communication unit 22 includes a plurality of reception units 221, a synthesis unit 222, a decoding unit 223, a storage unit 224, a schedule determination unit 225, and a parameter determination unit 226. The plurality of reception units 221 are provided corresponding to the plurality of first antennas 21. Each reception unit 221 receives a signal via the corresponding first antenna 21. The synthesis unit 222 synthesizes the signals received by the plurality of reception units 221 in accordance with a synthesis parameter, and thereby reproduces a terminal uplink signal. The synthesis parameter is represented by, for example, offsets of the phases and the amplitudes of the first antennas 21. The decoding unit 223 decodes data from the terminal uplink signal reproduced by the synthesis unit 222. The mobile relay station 2 according to the first embodiment is an example of a signal processing device.

The storage unit 224 stores position data of the terminal station 3 and orbit data of the LEO satellite. The position data of the terminal station 3 is represented by, for example, latitude and longitude. The orbit data of the LEO is data whereby the position, velocity, movement direction, etc. of the LEO satellite at an arbitrary time can be obtained.

According to the position data of the terminal station 3 and the orbit data stored in the storage unit 224, the schedule determination unit 225 determines an area to which the directivity of reception beams based on the plurality of first antennas 21 should be directed among a plurality of areas on the ground. In the first embodiment, each area is defined substantially in a rectangular parallelepiped shape according to latitude and longitude. Since the length of the latitude line varies with latitude, each area is not strictly a rectangular parallelepiped. The schedule determination unit 225 identifies the area where the terminal station 3 is present (hereinafter, a presence area) among a plurality of areas. The schedule determination unit 225 calculates the coverage of the first antenna for each time according to the orbit data, and identifies a communication-available time zone for each area. According to the number of terminal stations 3 and the communication-available time zone for each presence area, the schedule determination unit 225 determines a directivity schedule indicating, for each time, an area to which the directivity of reception beams based on the plurality of first antennas 21 should be directed.

Figure 2:
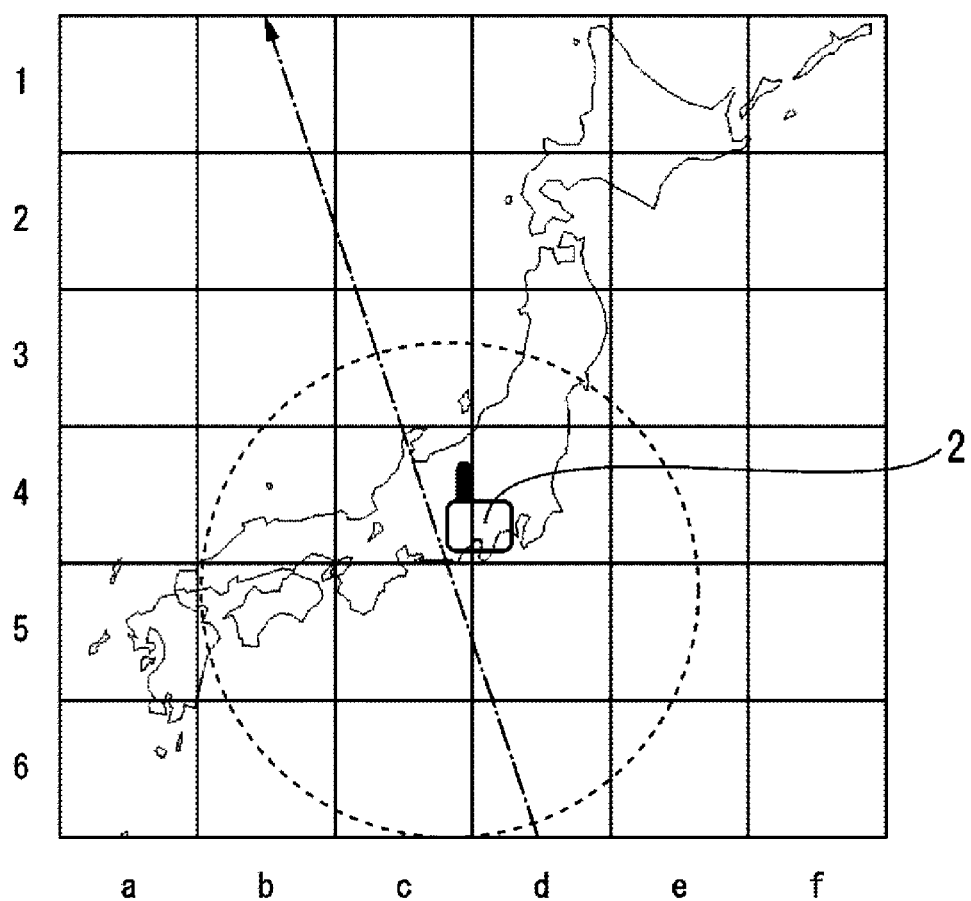
FIG. 2 is a diagram showing an example of a relationship between an area and a mobile relay station according to the first embodiment.

FIG. 2 is a diagram showing an example of a relationship between an area and the mobile relay station 2 according to the first embodiment. In the example shown in FIG. 2, the ground is divided into a plurality of areas. Each area is defined by predetermined latitude lines and predetermined longitude lines. In the example shown in FIG. 2, 36 areas, which are made by division into six in the latitude direction and six in the longitude direction, are depicted. The areas shown in FIG. 2 are allocated signs of 1 to 6 allocated in the latitude direction and signs of a to f allocated in the longitude direction, and are each uniquely specified by a combination of signs of latitude and longitude. As shown in FIG. 2, the coverage of the mobile relay station 2 is projected in a circular shape on the ground surface, and keeps a fixed positional relationship with the mobile relay station 2. The mobile relay station 2 moves along a predetermined orbit. The orbit of the mobile relay station 2 is inclined with respect to the latitude direction and the longitude direction.

In the example shown in FIG. 2, the areas belonging to the coverage of the mobile relay station 2 are 3c, 3d, 4b, 4c, 4d, 4e, 5b, 5c, 5d, 5e, 6c, and 6d. Here, supposing that a large number of terminal stations 3 are installed on the ground, the presence areas in the coverage are 3d, 4b, 4c, 4d, 5b, and 5c.

FIG. 3 is a diagram showing changes of presence areas in the coverage according to the first embodiment. According to the orbit data of the LEO satellite, the schedule determination unit 225 can identify communication-available times for each presence area by identifying communication-available presence areas for each time. The schedule determination unit 225 identifies the number of terminal stations 3 for each communication-available presence area according to the position data of the terminal stations 3 stored in the storage unit 224. The schedule determination unit 225 determines the directivity schedule such that the number of terminal stations 3 and the time to direct the directivity of the reception beam in each area are proportional to each other. In the directivity schedule, the directivity does not necessarily need to be directed to all the communication-available presence areas in one time zone. For example, although the communication-available presence areas during 2022/11/5 23:00-23:02 are 4c, 4d, and 5c, the directivity may be directed to 4c and 4d and the directivity may not be directed to 5c during 2022/11/5 23:00-23:02. That is, the schedule determination unit 225 generates the directivity schedule such that the number of terminal stations 3 and the time to direct the directivity of the reception beam in each area are proportional to each other in the entire directivity schedule related to one scan.

The parameter determination unit 226 sets a synthesis parameter of the synthesis unit 222 according to the directivity schedule determined by the schedule determination unit 225 and time. Relationships among the position of the mobile relay station 2, the area, and the synthesis parameter are obtained in advance by calculation.

The base station communication unit 24 relays the terminal uplink signal reproduced by the terminal communication unit 22 to the base station 4 by MIMO. The base station communication unit 24 includes a storage unit 241, a control unit 242, a transmission data modulation unit 243, and a MIMO transmission unit 244. The storage unit 241 stores in advance a weight for each transmission time of a base station downlink signal to be transmitted from each second antenna 25. The transmission time may be represented by, for example, an elapsed time from the transmission start timing. The weight for each transmission time is calculated according to the orbit data of the LEO satellite and the position of each antenna station 41.

The control unit 242 presents the MIMO transmission unit 244 with the weight for each transmission time read out from the storage unit 241. The transmission data modulation unit 243 inputs, as transmission data, demodulation information outputted by the parameter determination unit 226, converts the inputted transmission data into parallel signals, and then modulates the parallel signals. The MIMO transmission unit 244 weights the modulated parallel signal by means of the weight presented from the control unit 242, and generates a base station downlink signal to be transmitted from each second antenna 25. The MIMO transmission unit 244 transmits the generated base station downlink signals from the second antennas 25 by MIMO.

The terminal station 3 includes a data storage unit 31, a position measurement unit 32, a transmission unit 33, and one or a plurality of antennas 34. The data storage unit 31 stores sensor data and orbit data of the LEO satellite. The position measurement unit 32 acquires position data indicating the position of the terminal station 3 by a GNSS (global navigation satellite system) or the like.

The transmission unit 33 determines a transmission time zone of terminal uplink signals according to the orbit data of the LEO satellite. That is, the transmission unit 33 determines, as a transmission time zone of terminal uplink signals, a time zone in which the area where the terminal station 3 is present is present within the coverage of the antennas included in the mobile relay station 2. The transmission unit 33 wirelessly transmits, from the antenna 34, a terminal uplink signal in which the sensor data stored in the data storage unit 31 and the position data measured by the position measurement unit 32 are set as terminal transmission data. The transmission unit 33 transmits signals by, for example, LPWA (low power wide area). LPWA includes LoRaWAN (registered trademark), Sigfox (registered trademark), LTE-M (Long-Term Evolution for Machines), NB (Narrow Band)-IoT, etc.; any wireless communication system can be used. Further, the transmission unit 33 may perform transmission with another terminal station 3 by time division multiplexing, OFDM (orthogonal frequency division multiplexing), MIMO, or the like. By a method determined in advance in the wireless communication system used, the transmission unit 33 determines a channel and a transmission timing to be used for transmission of a terminal uplink signal by its own station. Further, the transmission unit may, by a method determined in advance in the wireless communication system used, perform beam formation of signals to be transmitted from a plurality of antennas 34.

The base station 4 includes a plurality of antenna stations 41, a MIMO reception unit 42, a base station signal reception processing unit 43, and a terminal signal reception processing unit 44.

The antenna station 41 is placed in a position apart from the other antenna stations 41 so that arrival angle differences between signals from the plurality of second antennas 25 of the mobile relay station 2 are increased. Each antenna station 41 converts the base station downlink signal received from the mobile relay station 2 into an electrical signal, and outputs the electrical signal to the MIMO reception unit 42.

The MIMO reception unit 42 aggregates the base station downlink signals received from the plurality of antenna stations 41. The MIMO reception unit 42 stores a weight for each reception time for the base station downlink signal received by each antenna station 41 according to the orbit data of the LEO satellite and the position of each antenna station 41. For example, the reception time may be represented by an elapsed time from the reception start timing. The MIMO reception unit 42 calculates, for the base station downlink signal inputted from each antenna station 41, a weight corresponding to the reception time of the base station downlink signal, and synthesizes the reception signals of which the weights are calculated. Note that the same weight may be used regardless of the reception time. The base station signal reception processing unit 43 demodulates and decodes the synthesized reception signal to obtain demodulation information. The demodulation refers to conversion of an RF signal into a baseband signal. The decoding refers to obtainment of data from a symbol included in a baseband signal. The base station signal reception processing unit 43 outputs the demodulation information to the terminal signal reception processing unit 44.

The terminal signal reception processing unit 44 performs reception processing of the terminal uplink signal. The terminal signal reception processing unit 44 includes a terminal signal decoding unit 441. The terminal signal decoding unit 441 decodes a symbol of the terminal uplink signal indicated by the demodulation information, and obtains the terminal transmission data transmitted from the terminal station 3.

An operation of the wireless communication system 1 will now be described.

Figure 4:
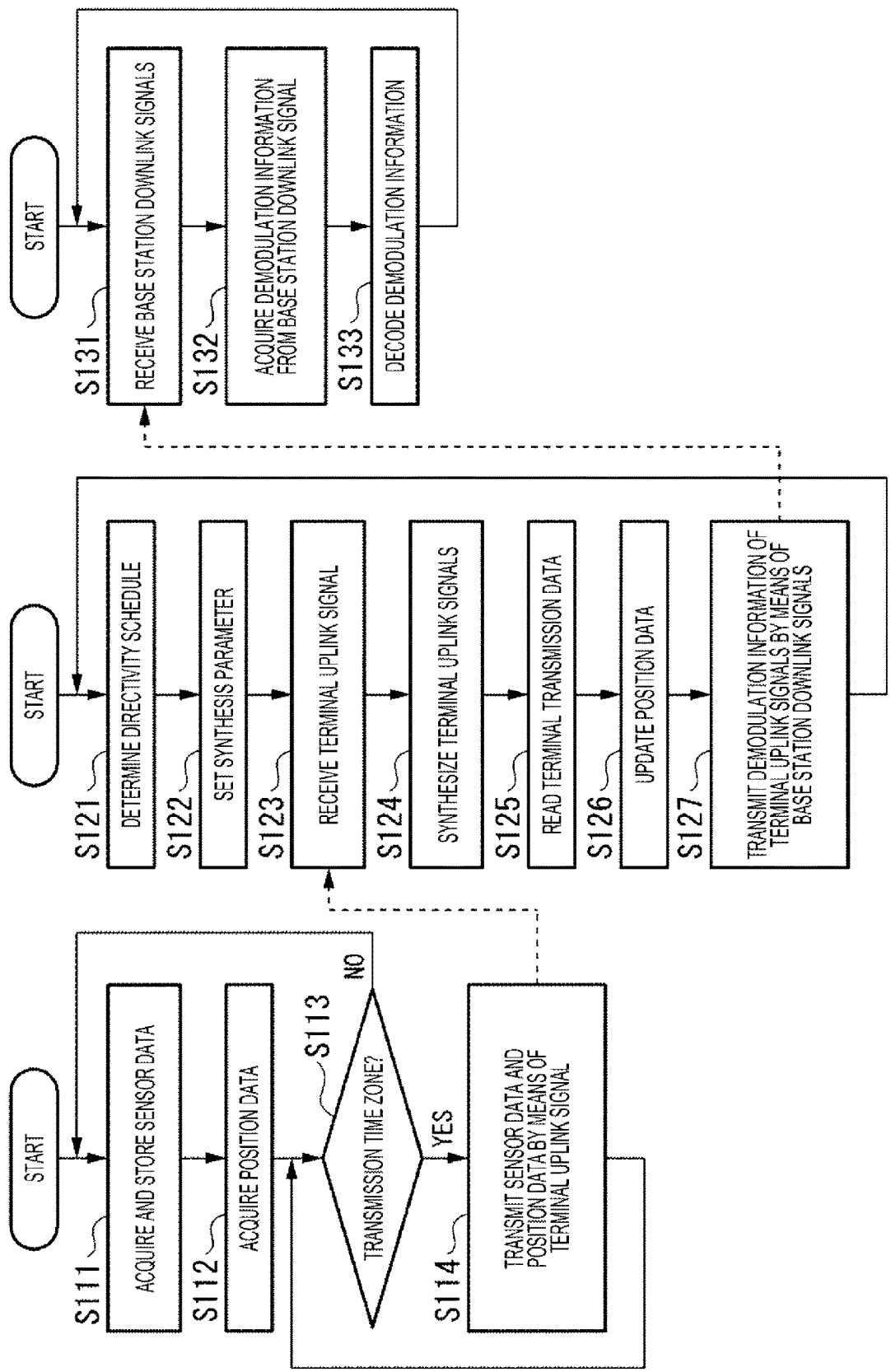
FIG. 4 is a flowchart showing processing of the wireless communication system according to the first embodiment.

FIG. 4 is a flowchart showing processing of the wireless communication system 1 according to the first embodiment. The terminal station 3 acquires data detected by a not-illustrated sensor provided outside or inside, and writes the acquired data on the data storage unit 31 (step S111). The position measurement unit 32 acquires position data of the terminal station 3 according to a GNSS or the like (step S112). The transmission unit 33 decides whether the current time is included in a transmission time zone of uplink signals or not according to the position data acquired in step S112 and orbit data of the LEO satellite (step S113). In the case where the transmission unit 33 has decided that the current time is not included in the transmission time zone of uplink signals (step S113: NO), the terminal station 3 returns the processing to step S111.

On the other hand, in the case where the transmission unit 33 has decided that the current time is included in the transmission time zone of uplink signals (step S113: YES), the transmission unit 33 reads out sensor data from the data storage unit 31, and sets, in a terminal uplink signal, the read out sensor data and the position data acquired in step S112 as terminal transmission data. The transmission unit 33 wirelessly transmits, from the antenna 34, the terminal uplink signal in which the terminal transmission data is set (step S114). The terminal station 3 returns the processing to step S113. Thus, the terminal station 3 continues the transmission of uplink signals during the transmission time zone.

According to the position data of the terminal station 3 and the orbit data stored in the storage unit 224, the schedule determination unit 225 of the mobile relay station 2 determines a directivity schedule indicating, for each time, an area to which the directivity of reception beams based on the plurality of first antennas 21 should be directed (step S121). The parameter determination unit 226 sets a synthesis parameter of the synthesis unit 222 at the current time according to the directivity schedule determined by the schedule determination unit 225 and the orbit data (step S122).

The plurality of reception units 221 of the mobile relay station 2 receive the terminal uplink signal transmitted from the terminal station 3 (step S123). Depending on the wireless communication system of the terminal station 3 of a transmission source, there are a case where, for the same frequency, terminal uplink signals are received from only one terminal station 3 in a time division manner and a case where terminal uplink signals are simultaneously received from a plurality of terminal stations 3 at the same frequency. The synthesis unit 222 synthesizes the terminal uplink signals received by the plurality of reception units 221 in accordance with the synthesis parameter set in step S122 (step S124). By this synthesis, the signal transmitted by the terminal station 3 present in the area to which the directivity is directed in the directivity schedule is emphasized, and the influence of randomly added noise and the signals transmitted by the terminal stations 3 present in the other areas is reduced. The decoding unit 223 demodulates and decodes the terminal uplink signal from the synthesized signal, and reads the terminal transmission data (step S125). The decoding unit 223 updates the position data stored in the storage unit 224 by means of the position data of the terminal station 3 included in the read terminal transmission data (step S126).

The transmission data modulation unit 243 of the mobile relay station 2 inputs, as transmission data, demodulation information demodulated by the decoding unit 223. The transmission data modulation unit 243 performs parallel conversion and then modulation on the transmission data. The MIMO transmission unit 244 weights the transmission data modulated by the transmission data modulation unit 243 with a weight presented from the control unit 242, and generates a base station downlink signal to be transmitted from each second antenna 25. The MIMO transmission unit 244 transmits the generated base station downlink signals from the second antennas 25 by MIMO (step S127). The mobile relay station 2 repeats the processing from step S121.

Each antenna station 41 of the base station 4 receives the base station downlink signal from the mobile relay station 2 (step S131). Each antenna station 41 outputs a reception signal obtained by converting the received base station downlink signal into an electrical signal to the MIMO reception unit 42. The MIMO reception unit 42 synchronizes the timings of the reception signals received from the antenna stations 41. The MIMO reception unit 42 synthesizes, using weights, the reception signals received by the antenna stations 41. The base station signal reception processing unit 43 demodulates the synthesized reception signal (step S132). The base station signal reception processing unit 43 outputs demodulation information obtained by decoding the demodulated reception signal to the terminal signal reception processing unit 44.

The terminal signal decoding unit 441 of the terminal signal reception processing unit 44 decodes a symbol of the terminal uplink signal indicated by the demodulation information, and obtains the terminal transmission data transmitted from the terminal station 3 (step S133). The terminal signal decoding unit 441 can also use a decoding system with a large calculation load, such as SIC (Successive Interference Cancellation). The base station 4 repeats the processing from step S131.

According to the first embodiment, the mobile relay station 2 receives a terminal uplink signal while, according to the position of the terminal station 3, the orbit data of the LEO satellite, and time, directing the directivity of the reception beam to the area where the terminal station 3 is present. Thereby, the mobile relay station 2 can improve antenna gain with the terminal station 3. Further, the mobile relay station 2 receives position data from the terminal station 3, and sequentially updates the position of the terminal station 3 stored in the storage unit 224. Thereby, even if the terminal station 3 moves, the mobile relay station 2 can appropriately direct the direction of the reception beam to the area where the terminal station 3 is present. The distance between the mobile relay station 2 and the terminal station 3 is, even in the same coverage, greatly different between the vicinity of the center and the vicinity of the end of the coverage. In contrast, according to the first embodiment, the variation in the distance between the mobile relay station 2 and the terminal station 3 of a communication target can be reduced by the application of reception beams by the mobile relay station 2. Thereby, the mobile relay station 2 can reduce the necessity of compensating for distance differences between terminal stations 3.

Further, according to the first embodiment, the mobile relay station 2 varies the time to direct the directivity to the area in accordance with the number of terminal stations 3 present in each area. Thereby, the opportunities for reception of terminal uplink signals of terminal stations 3 can be equalized regardless of the density of terminal stations 3 in the area.

Second Embodiment

In a wireless communication system 1 according to a second embodiment, waveform data of terminal uplink signals are accumulated, and a base station downlink signal in which the accumulated waveform data is set is wirelessly transmitted to the base station 4. The wireless communication system 1 according to the second embodiment will now be described centering on differences from the first embodiment.

Figure 5:
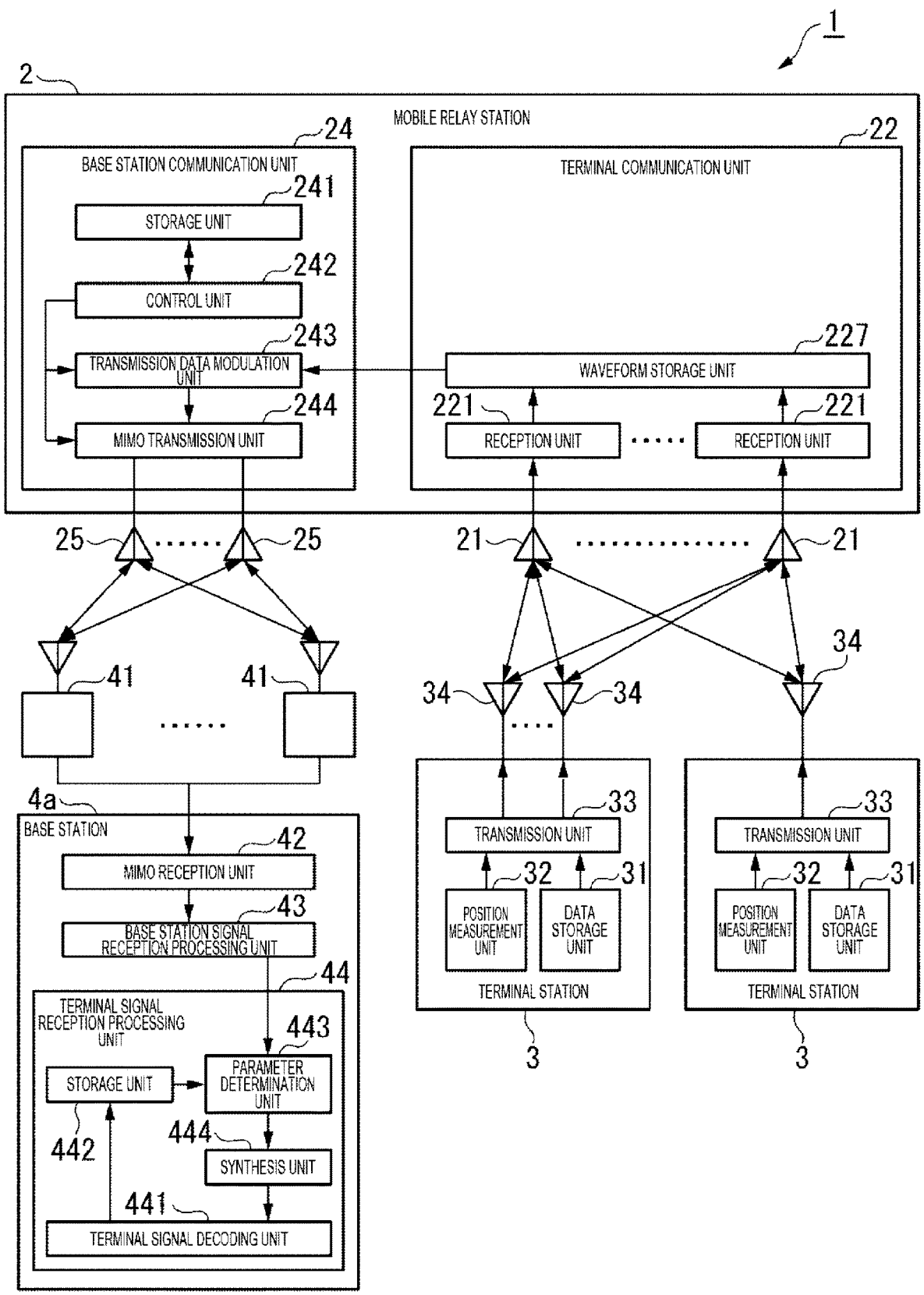
FIG. 5 is a configuration diagram of a wireless communication system according to a second embodiment.

FIG. 5 is a configuration diagram of the wireless communication system 1 according to the second embodiment. A mobile relay station 2 according to the second embodiment includes a waveform storage unit 227 in place of the synthesis unit 222, the decoding unit 223, the storage unit 224, the schedule determination unit 225, and the parameter determination unit 226 according to the first embodiment. The waveform storage unit 227 stores waveform data of signals received by the reception units 221. Specifically, the waveform storage unit 227 stores an ID of the first antenna 21, the reception time of a signal, and waveform data while associating them with each other. Each reception unit 221 samples a reception waveform of the received signal, and records the sample on the waveform storage unit 227.

A terminal signal reception processing unit 44 of a base station 4 according to the second embodiment further includes a storage unit 442, a parameter determination unit 443, and a synthesis unit 444 in addition to the configuration of the first embodiment.

The storage unit 442 stores position data of the terminal station 3 and orbit data of the LEO satellite for each time. The parameter determination unit 443 reads out, from the storage unit 442, the position data of a terminal station 3 that has transmitted a terminal uplink signal to be decoded, and identifies the time zone in which the terminal station 3 transmitted the terminal uplink signal according to the read out position data and the orbit data of the LEO satellite. According to the position of the LEO satellite related to the identified time zone, the parameter determination unit determines a synthesis parameter whereby the signal intensity from the area where the terminal station 3 is present is increased.

The synthesis unit 444 extracts, among waveform data obtained by decoding by the base station signal reception processing unit 43, waveform data for each antenna received in the identified time zone. The synthesis unit 444 synthesizes waveforms indicated by the plurality of extracted waveform data in accordance with the synthesis parameter determined by the parameter determination unit 443. The terminal signal decoding unit 441 decodes a symbol of the terminal uplink signal from the waveform obtained by synthesis by the synthesis unit 444, and obtains the terminal transmission data transmitted from the terminal station 3.

Figure 6:
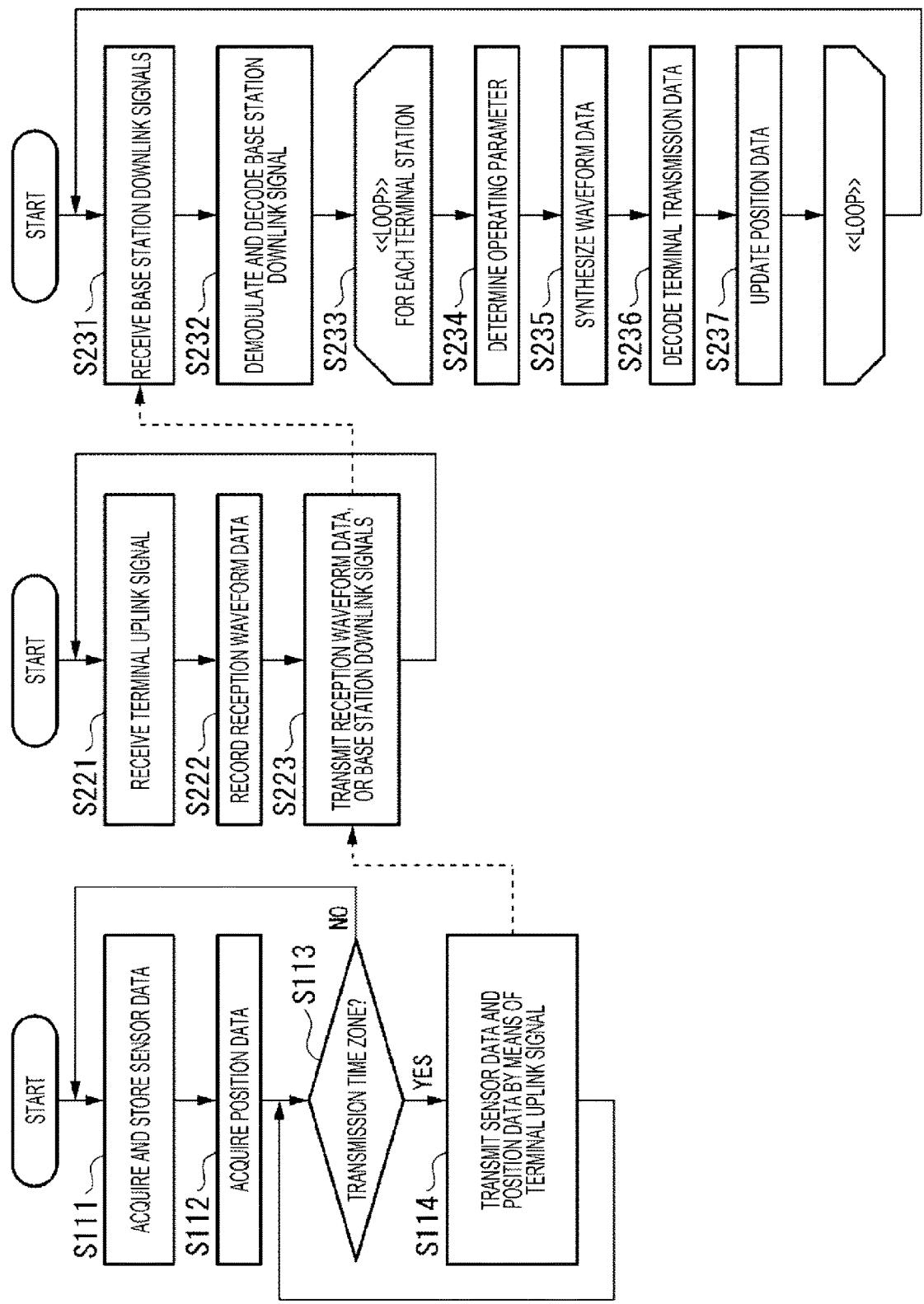
FIG. 6 is a flowchart showing processing of the wireless communication system according to the second embodiment.

FIG. 6 is a flowchart showing processing of the wireless communication system 1 according to the second embodiment. The terminal station 3 according to the second embodiment performs processing similar to that of the first embodiment.

The plurality of reception units 221 of the mobile relay station 2 receive a terminal uplink signal transmitted from the terminal station 3 (step S221). Each reception unit 221 samples the received signal to generate waveform data, and records the waveform data on the waveform storage unit 227 while associating it with an ID of the first antenna 21 and the reception time (step S222).

The transmission data modulation unit 243 of the mobile relay station 2 inputs, as transmission data, the plurality of waveform data stored in the waveform storage unit 227. The transmission data modulation unit 243 performs parallel conversion and then modulation on the transmission data. The MIMO transmission unit 244 weights the transmission data modulated by the transmission data modulation unit 243 with a weight presented from the control unit 242, and generates a base station downlink signal to be transmitted from each second antenna 25. The MIMO transmission unit 244 transmits the generated base station downlink signals from the second antennas 25 by MIMO (step S223). The mobile relay station 2 repeats the processing from step S221.

Each antenna station 41 of the base station 4 receives the base station downlink signal from the mobile relay station 2 (step S231). Each antenna station 41 outputs a reception signal obtained by converting the received base station downlink signal into an electrical signal to the MIMO reception unit 42. The MIMO reception unit 42 synchronizes the timings of the reception signals received from the antenna stations 41. The MIMO reception unit 42 synthesizes, using weights, the reception signals received by the antenna stations 41. The base station signal reception processing unit 43 demodulates the synthesized reception signal. The base station signal reception processing unit 43 outputs waveform data obtained by decoding the demodulated reception signal to the terminal signal reception processing unit 44 (step S232).

The terminal signal reception processing unit 44 selects a plurality of terminal stations 3 one by one (step S233), and executes the processing of step S234 to step S237 below for each terminal station 3.

The parameter determination unit 443 of the terminal signal reception processing unit 44 reads out the position data of the terminal station 3 selected in step S233 from the storage unit 442. According to the read out position data and the orbit data of the LEO satellite, the parameter determination unit 443 identifies the time zone in which the terminal station 3 selected in step S233 transmitted the terminal uplink signal. According to the position of the LEO satellite related to the identified time zone, the parameter determination unit 443 determines a synthesis parameter whereby the signal intensity from the area where the terminal station 3 is present is increased (step S234).

The synthesis unit 444 extracts, among the waveform data demodulated in step S232, waveform data related to the time zone in which the terminal station 3 selected in step S233 transmitted the terminal uplink signal. The synthesis unit 444 synthesizes waveforms indicated by the plurality of extracted waveform data in accordance with the synthesis parameter determined in step S234 (step S235). The terminal signal decoding unit 441 decodes a symbol of the terminal uplink signal from the waveform obtained by synthesis by the synthesis unit 444, and obtains the terminal transmission data transmitted from the terminal station 3 (step S236). The terminal signal decoding unit 441 updates the position data of the terminal station 3 stored in the storage unit 442 by using the position data of the terminal station 3 included in the terminal transmission data (step S237). The base station 4 repeats the processing from step S231.

According to the second embodiment, according to the position of the terminal station 3, the orbit data of the LEO satellite, and time, the base station 4 synthesizes waveform data such that the signal intensity from the area where the terminal station 3 is present is increased. Thereby, the base station 4 can improve communication quality by compensating for a propagation loss with the terminal station 3. Further, the base station 4 reads out position data from the terminal uplink signal, and sequentially updates the position of the terminal station 3 stored in the storage unit 442. Thereby, even if the terminal station 3 moves, the base station 4 synthesizes waveform data such that the signal intensity from the area where the terminal station 3 is present is increased. Thereby, the base station 4 can improve communication quality by compensating for a propagation loss with the terminal station 3.

Hereinabove, an embodiment is described in detail with reference to the drawings; however, the specific configuration is not limited to those described above, and various design changes and the like can be made. That is, in another embodiment, the order of the processing described above may be changed as appropriate. Further, some pieces of processing may be executed in parallel.

Figure 7:
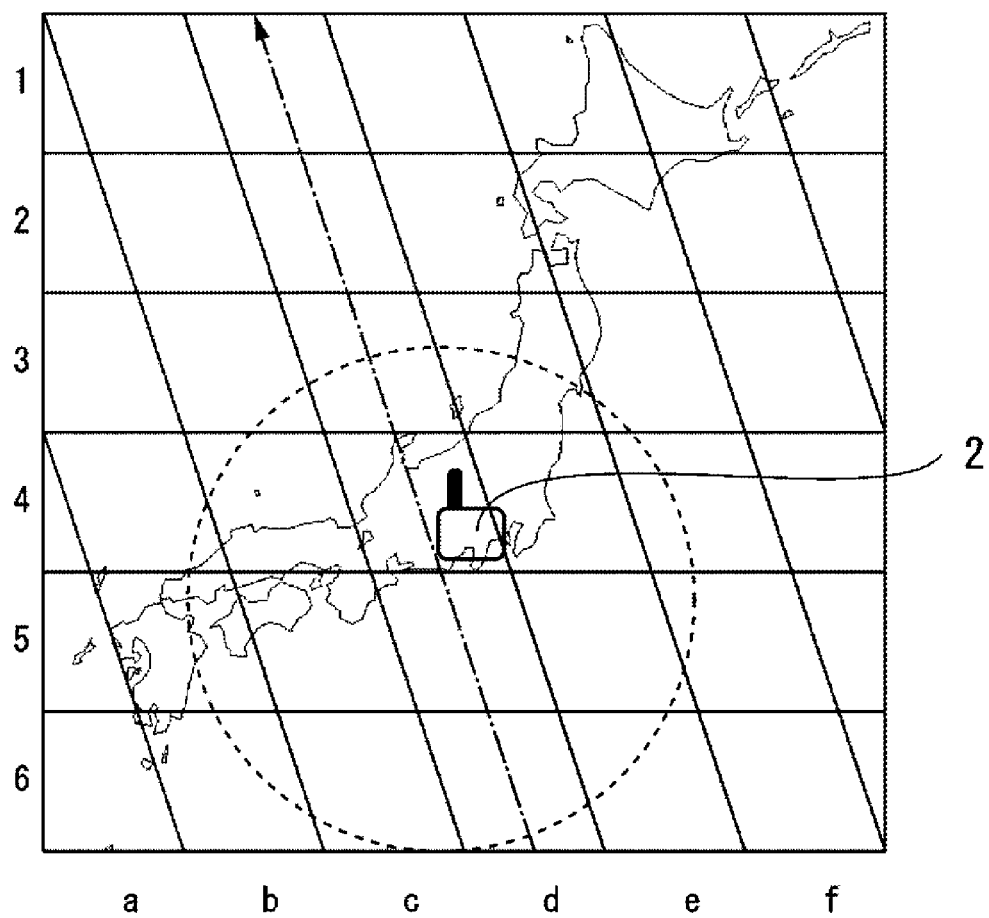
FIG. 7 is a diagram showing a relationship according to the second embodiment between an orbit and an area when a LEO satellite goes north.
Figure 8:
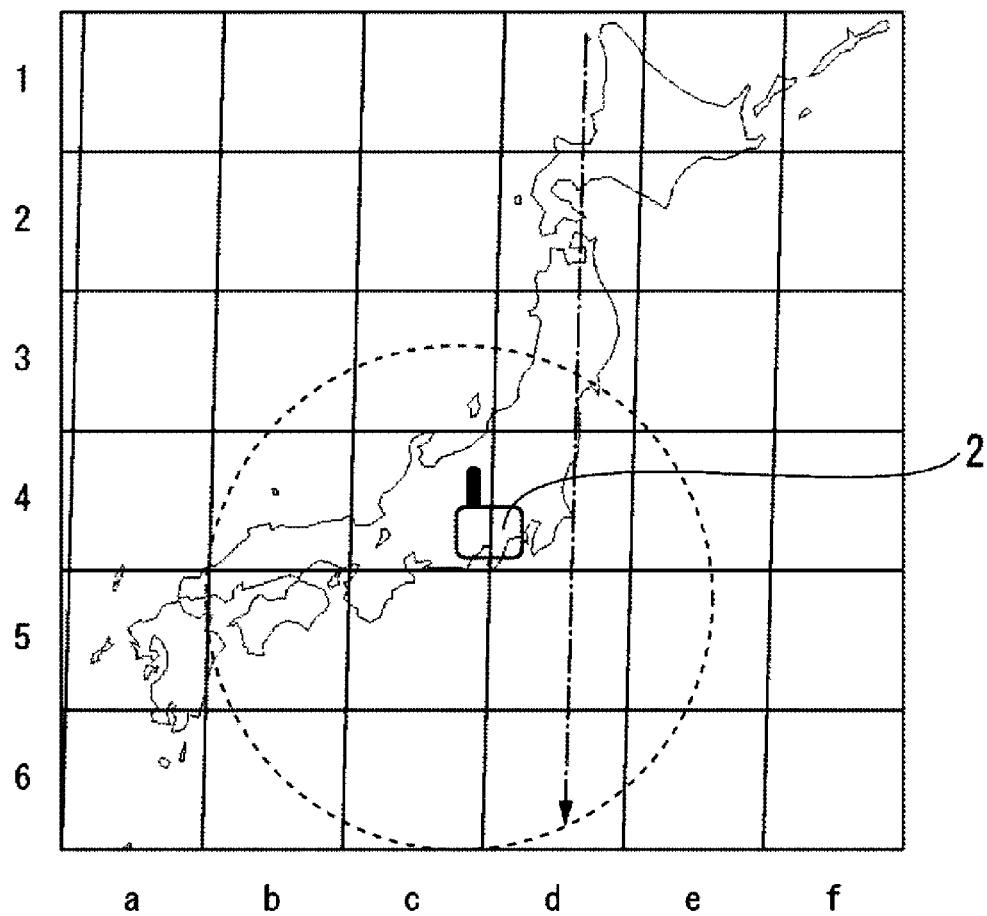
FIG. 8 is a diagram showing a relationship according to the second embodiment between an orbit and an area when a LEO satellite goes south.

Although in the above embodiment each area is defined by latitude and longitude as shown in FIG. 2, the present invention is not limited thereto. For example, an area according to another embodiment may be defined by lines parallel to the orbit of the LEO satellite instead of longitude. FIG. 7 is a diagram showing a relationship according to the second embodiment between an orbit and an area when the LEO satellite goes north. FIG. 8 is a diagram showing a relationship according to the second embodiment between an orbit and an area when the LEO satellite goes south. The hour rate of the area can be equalized by defining the area by straight lines parallel to the orbit of the LEO satellite. When the LEO satellite moves in a quasi-zenith orbit, the orbital angle is different between the time of going north and the time of going south. Thus, the mobile relay station 2 or the base station 4 stores the relationship between the area and the position for each of the time of going north and the time of going south, and when generating a synthesis parameter, determines the area where the terminal station 3 is present in accordance with whether the LEO satellite is going north or south.

Although in the above embodiment the mobile relay station 2 is mounted on a LEO satellite, the present invention is not limited thereto. For example, a mobile relay station 2 according to another embodiment may be mounted on another flying object such as a geostationary satellite, a drone, or a HAPS. Further, although in the above embodiment the mobile relay station 2 moves above the earth and the terminal station 3 and the base station 4 are provided on the earth, a wireless communication system 1 according to another embodiment may target a celestial body other than the earth, such as the moon.

Although in the above embodiment the terminal station 3 autonomously specifies a timing of transmitting a terminal uplink signal, the present invention is not limited thereto in another embodiment. For example, a terminal station 3 according to another embodiment may receive a notification of transmission timing by a beacon signal or the like from the mobile relay station 2, and transmit a terminal uplink signal in accordance with the transmission timing.

A signal processing device created with the mobile relay station 2 or the base station 4 includes a processor, a memory, an auxiliary storage device, etc. connected by a bus, and includes each processing unit by executing a signal processing program. Examples of the processor include a CPU (central processing unit), a GPU (graphic processing unit), a microprocessor, and the like.

The signal processing program may be recorded on a computer-readable recording medium. The computer-readable recording medium is a storage device such as a magnetic disk, a magneto-optical disk, an optical disk, or a semiconductor memory, for example. The signal processing program may be transmitted via a telecommunication line.

All or some of the functions of the signal processing device may be implemented by using a custom LSI (large scale integrated circuit) such as an ASIC (application specific integrated circuit) or a PLD (programmable logic device). Examples of the PLD include a PAL (programmable array logic), a GAL (generic array logic), a CPLD (complex programmable logic device), and an FPGA (field programmable gate array). Also such integrated circuits are included in examples of the processor.

REFERENCE SIGNS LIST

1 Wireless communication system
2 Mobile relay station
21 First antenna
22 Terminal communication unit
221 Reception unit
222 Synthesis unit
223 Decoding unit
224 Storage unit
225 Schedule determination unit
226 Parameter determination unit
227 Waveform storage unit
24 Base station communication unit
241 Storage unit
242 Control unit
243 Transmission data modulation unit
244 MIMO transmission unit
25 Second antenna
3 Terminal station
31 Data storage unit
32 Position measurement unit
33 Transmission unit
34 Antenna
4 Base station
41 Antenna station
42 MIMO reception unit
43 Base station signal reception processing unit
44 Terminal signal reception processing unit
441 Terminal signal decoding unit
442 Storage unit
443 Parameter determination unit
444 Synthesis unit

The invention claimed is:

1. A signal processing device comprising:
one or more processors configured to perform as:
an acquisition unit configured to acquire a plurality of signals received by a plurality of antennas included in a wireless communication device that moves in a predetermined orbit above a celestial body;
a parameter determination unit configured to determine a synthesis parameter of the plurality of signals according to a position of a transmission terminal provided on the celestial body, the orbit, and a reception time of the plurality of signals; and
a synthesis unit is configured to synthesize the plurality of signals according to the synthesis parameter.

2. The signal processing device according to claim 1, wherein
a signal transmitted by the transmission terminal includes data indicating a position of the transmission terminal,
the signal processing device comprises a decoding unit configured to decode a signal synthesized by the synthesis unit and the decoding unit reads out the position of the transmission terminal, and
the parameter determination unit is configured to determine the synthesis parameter according to the read out position of the transmission terminal.

3. The signal processing device according to claim 1, wherein the parameter determination unit is configured to determine the synthesis parameter such that reception beams of the plurality of antennas are directed to an area where the transmission terminal is present among a plurality of areas on the celestial body.

4. The signal processing device according to claim 3, wherein
the area is defined by a straight line parallel to the orbit.

5. The signal processing device according to claim 3, being mounted on the wireless communication device, wherein
the parameter determination unit is configured to determine, for each of the plurality of areas, a time to direct directivity of the plurality of antennas in accordance with the number of transmission terminals in each of the plurality of areas.

6. The signal processing device according to claim 1, wherein
the signal processing device is provided on the celestial body, and
the acquisition unit is configured to receive the plurality of signals from the wireless communication device by wireless communication.

7. A wireless communication system comprising:
the signal processing device according to claim 1;
the wireless communication device configured to move in the predetermined orbit above the celestial body and includes the plurality of antennas; and
a transmission terminal provided on the celestial body,
wherein the transmission terminal comprises:
a storage configured to store observation data observed on the celestial body; and
one or more processors configured to perform as:
 a position acquisition unit configured to acquire position data indicating a position of the transmission terminal;
 a timing determination unit configured to determine a timing of transmitting the observation data according to the orbit of the wireless communication device; and
 a transmission unit configured to transmit a signal storing the observation data and the position data at the determined timing.

8. A signal processing method comprising:
a step of acquiring a plurality of signals received by a plurality of antennas included in a wireless communication device that moves in a predetermined orbit above a celestial body;
a step of determining a synthesis parameter of the plurality of signals according to a position of a transmission terminal provided on the celestial body, the orbit, and a reception time of the plurality of signals; and
a step of synthesizing the plurality of signals according to the synthesis parameter.

* * * * *